United States Patent [19]

Romanski

[11] Patent Number: 4,787,946
[45] Date of Patent: Nov. 29, 1988

[54] METHOD OF MAKING A PAPER MACHINE PRESS BELT

[75] Inventor: Eric R. Romanski, Delmar, N.Y.

[73] Assignee: Albany International Corp., Menands, N.Y.

[21] Appl. No.: 83,698

[22] Filed: Aug. 7, 1987

[51] Int. Cl.$^4$ .................. B29D 17/00; F16G 1/00; B32B 31/00
[52] U.S. Cl. .................. 156/137; 156/153; 156/247; 156/273.5; 156/331.7
[58] Field of Search .......... 156/153, 273.5, 331.1, 156/331.7, 247, 249, 137; 428/423.1, 425.8, 906; 264/331.19

[56] References Cited

U.S. PATENT DOCUMENTS 4,267,139 5/1981 Scheibe et al. .................. 264/330 X
4,643,916 2/1987 Kiuchi .................. 156/137 X Primary Examiner—Michael Lusignan
Attorney, Agent, or Firm—Kane, Dalsimer, Sullivan, Kurucz, Levy, Eisele and Richard

[57] ABSTRACT

A method of forming a belt for use in papermaking includes applying a first coat of liquid urethane to a smooth mandrel, drying the first coat, grinding the first coat to a predetermined thickness, placing a woven fabric sleeve on the coated mandrel, shrinking the fabric sleeve, applying a second coat of liquid urethane thereto, drying the second coat, and removing the belt from the mandrel.

9 Claims, 3 Drawing Sheets

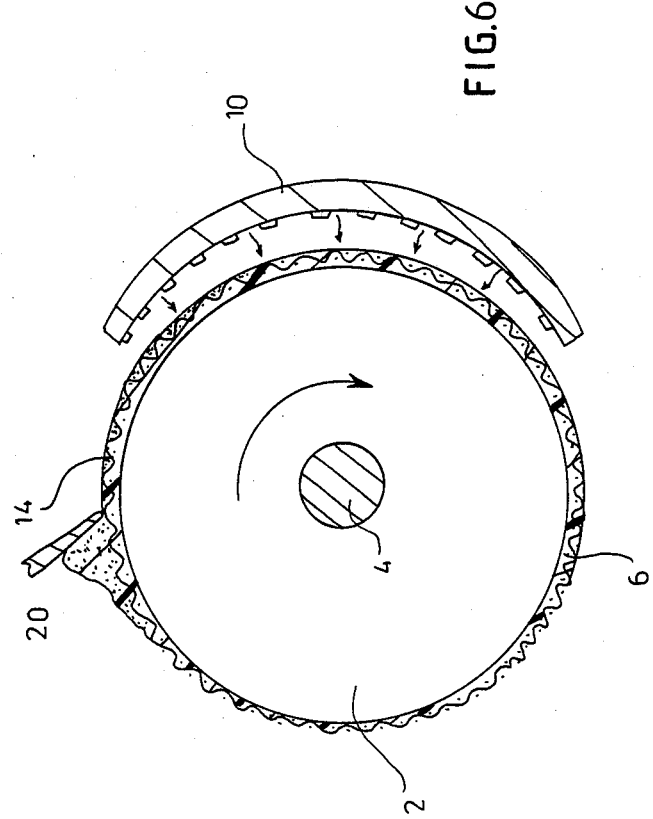

METHOD OF MAKING A PAPER MACHINE PRESS BELT

BACKGROUND OF THE INVENTION

1. Field of the Invention

The field of the invention relates to methods for making impermeable belts with smooth inner surfaces and more particularly a belt used in an extended nip press for dewatering a fibrous web formed in a papermaking machine.

2. Description of the Prior Art

Extended nip presses are currently used in the papermaking industry in the formation of paper and craft products many presses of this type use an endless, impervious, oil, abrasion and crush resistant belt which runs against the shoe in the press nip. Early designs used long belts in the range of 25 to 50 feet.

The more recent extended nip press designs have been scaled down in size and require belts of much shorter lengths. These recent press designs generally incorporate a circular belt configuration, in the shape of a drum, circumscribing the nip, rather than an expanded rectangular belt configuration as was used in the early designs.

The long belts used on earlier designed machines are made endless and are impregnated with a tough thermoset resin.

The coated surface is then ground to a uniform thickness and polished smooth. The belt is then inverted so the smooth impregnated surface is on the inside. Since during manufacture the outside of the belt is polished, and since it is the inside of the belt which must be smooth for communicating with an oil lubricated press shoe, inversion of the belt is necessary. With the development of the new extended nip presses, the length of belt has been reduced to 13 to 15 feet. Because of this reduced length the previous means of manufacture is inappropriate because a belt of such short length cannot be readily inverted. Not only is the process of inverting a short relatively brittle belt very difficult (if not impossible) but the stresses upon the belt in inverting it could create weak points in the belt leading to failure during use. The extended nip press requires that the belt be uniform in thickness and with the inner surface polished smooth so that it can ride on the oil lubricated pressure shoe which acts as a hydraulic bearing.

Belts used in extended nip presses generally require some sort of fiber reinforcement to withstand the tremendous pressures of up to 6,000 pounds per linear inch in operation. See e.g. U.S. Pat. No. 4,222,253. A belt commonly includes a base fabric or carcass coated with a resinous material. Uniformity of belt thickness as well as uniformity of level of carcass depth within the coating are essential in belts of this type. Processes for coating the carcass usually include the use of two rolls, one tension roll and one drive roll, and a coating or impregnation device. A method for forming a reinforced plastic belt loop is disclosed in U.S. Pat. No. 4,267,139 which involves placing an endless shrinkable carcass in a mold, then filling the mold with a casting plastic. The woven structure is then encapsulated in the cured plastic. A drawback of a belt made by this process is that the carcass, in order to achieve uniform depth within the coating, must be set to contact the inner support core of the mold. Consequently, in the final product, the carcass is disposed adjacent to the internal surface of the belt.

SUMMARY OF THE INVENTION

The present invention solves the problem in the prior art resulting from inverting the short endless belt after manufacture, and insures that the belt is uniform in thickness with a smooth inner surface. This is accomplished according to a method including the steps of applying a liquid coating of urethane to a polished mandrel, drying the coating, sliding a fabric carcass onto the mandrel, then applying a further liquid coat. As a result of using liquid coats of urethane and the polished mandrel the interior surface of the belt is smooth when removed from the mandrel. The belt is thus ready for mounting in an extended nip press wherein the interior of the belt must be smooth to reduce wear from friction with the pressure shoe.

A primary advantage of the present invention is that the belt produced includes a woven base fabric encapsulated therein to provide support for the belt in both the machine and cross machine directions. The base fabric is different than previously used base fabrics in that the circumferential yarns are shrinkable.

A further advantage of the present belt forming method is that due to the second layer of liquid urethane extending only to the outermost point of the fabric carcass, slightly raised portions or knuckles occur on the outer surface of the belt. The belt of the present invention is used in combination with a felt drying belt of the nip press. The knuckles, being formed on the outer surface of the belt, are advantageous in that they reduce slippage between the belts during use. The belts produced by the present invention meet the current need in the art for a long lasting belt providing quality performance.

Further advantages of the present invention will be evident from reading the following detailed description which is to be read in conjunction with the drawings.

BRIEF DESCRIPTION OF THE DRAWINGS

FIG. 6 is a sectional view of a further coating and drying step.

DETAILED DESCRIPTION OF THE INVENTION

Figure 1:
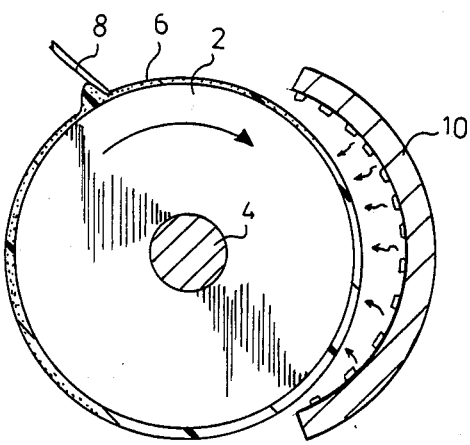
FIG. 1 is a section view of the step of applying a urethane coating to a polished mandrel and drying the coating.

FIG. 1 illustrates a building mandrel 2 which has a highly polished outer surface mounted on a shaft 4. The mandrel outer surface is polished to ultimately provide a polished inner surface to the belt during production. A tough thermoset resin, preferably a high viscosity liquid urethane is applied to the mandrel outer surface. In FIG. 1 the urethane is applied using a squeegee to form a first layer of coating. A paint roller may also be used. A heating device, such as an infra-red heating device 10 is used to dry the initial coating of urethane. Mandrel 2 is rotated in a clockwise manner as shown, urethane is applied evenly by squeegee 8, then dried (cured) by heating device 10. The heating device preferably mirrors 180° of the mandrel surface.

Figure 2:
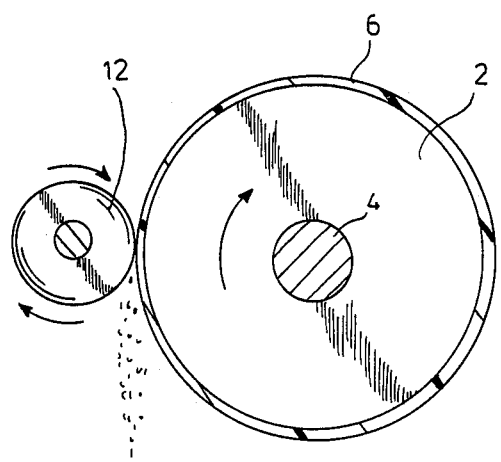
FIG. 2 is a sectional view illustrating grinding of the dried urethane coating to the specified thickness.

A reasonable thickness of cured urethane is built up on the polished mandrel surface, such as for example between 0.020 and 0.100 inches in thickness. This first coating of urethane is then ground (see FIG. 2) to a desired uniform thickness to within a tolerance of plus or minus 0.002 inches. Uniformity of thickness and accuracy of grinding are important. Any suitable conventional grinding means may be employed for this purpose such as a grinder/sander 12 as shown in FIG. 2. The grinding also serves to polish smooth the urethane coating.

Figure 3:
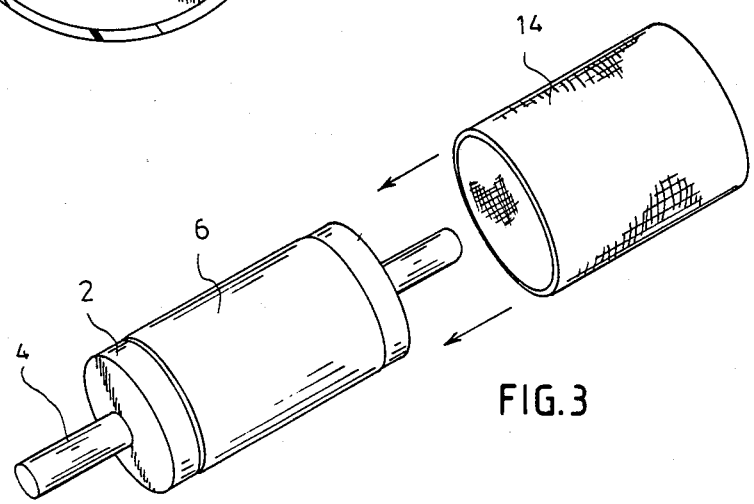
FIG. 3 is an exploded perspective view illustrating a base fabric carcass aligned for mounting onto the urethane coated mandrel of FIG. 2.
Figure 4:
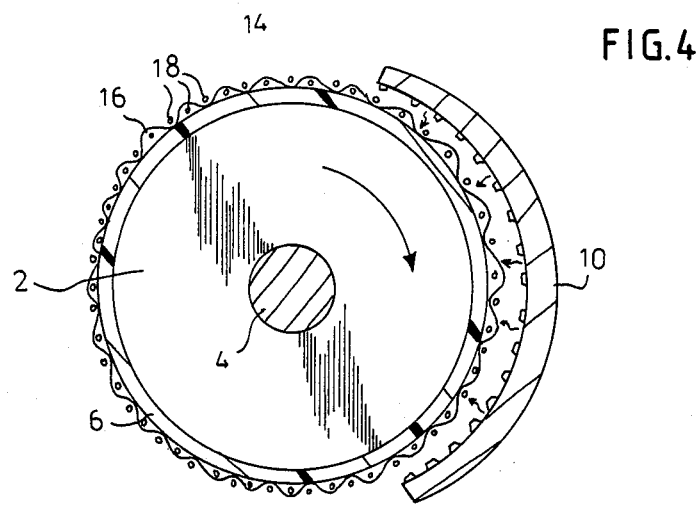
FIG. 4 is a sectional view of the base fabric carcass being heat shrunk onto the coated mandrel.

FIG. 3 illustrates mounting of an endless woven fabric carcass 14 onto mandrel 2 having a first coating of urethane 6 previously applied thereto. The tubular fabric carcass (or sleeve) preferably contains circumferential yarns which are heat shrinkable. The sleeve may be composed of nylon monofilaments. FIG. 4 illustrates the step of heat shrinking the sleeve onto the mandrel. Yarns 16 and 18 are designated for illustrative purposes. The same infrared heating system 10, as that used for drying the urethane, may be used. The sleeve 14 is shrunk onto mandrel 10 so that it attains a very tight fit.

Figure 5:
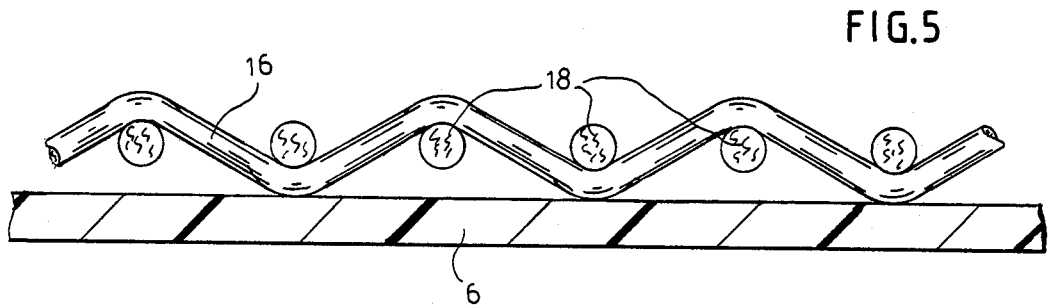
FIG. 5 is a sectional view of strands of the base fabric carcass resting on the initial urethane coating after the shrinking step illustrated in FIG. 4.
Figure 7:
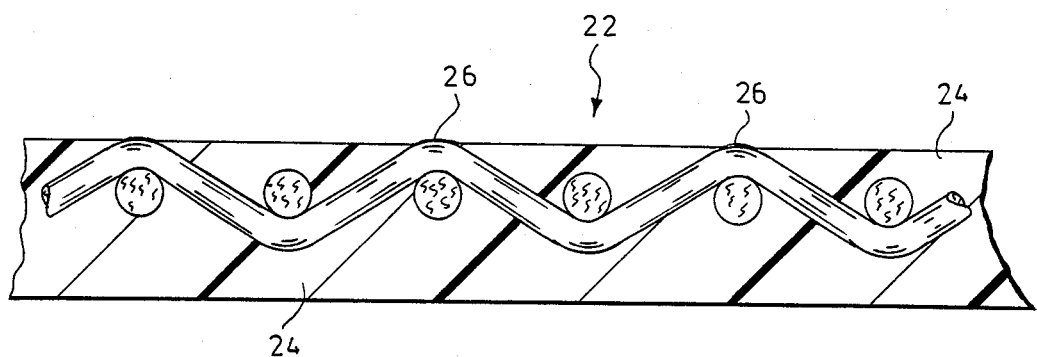
FIG. 7 is a sectional view similar to FIG. 5 after the further coating step of FIG. 6.

FIG. 5 is a close-up section view of the sleeve tightly shrink-fitted onto the urethane coated mandrel following the step illustrated in FIG. 4. Once the shrinkable sleeve is in place a second coating of high viscosity liquid urethane is squeegeed into and through the monofilament tubular sleeve fabric to make a bond with the previously cured urethane layer. This process is illustrated in FIG. 6. Squeegee 20 is shown to be bent in order to wipe away excess liquid urethane, which extends beyond the radially outermost points of the fabric carcass 14, to maintain the coating uniform in thicnness so that the completed belt accommodate a nip press, which requires a belt of uniform thickness. Once again drying device 10 is employed to cure the outer layer of urethane by a process similar to that shown in FIG. 1. As seen in FIG. 7, which is a sectional view of a completed belt, the infra-red heater cures the liquid urethane so as to bond the entire structure into a solid urethane encapsulated fabric sleeve.

Once the urethane encapsulated sleeve is cured the sleeve is removed from the forming mandrel. Compressed air is introduced between the polished surface of the mandrel and the primary urethane coating and the sleeve is floated off the mandrel. As noted above a release agent such as silicone is preferably applied to the polished mandrel surface before coating begins which aids in the sleeve removal.

FIG. 7 illustrates the belt 22, comprising the urethane encapsulated sleeve. Knuckles 26 are formed on the outer surface of belt 22 as a result of the surface wiping of squeegee 20 as shown in FIG. 6. The knuckles are important in use in order to better grip a felt belt (not shown) passing through the press nip. A unique feature of the belt of this invention is that the highly polished surface 24 provided by the building mandrel is created on the inner surface of the belt in order to provide a smooth surface for contact with the shoe of the extended nip. The quality of the smooth surface of belt 22 is equal to, or superior to belts of the prior art. Moreover, the belt does not have to be inverted. A further benefit of belt 22 is that the structure is reinforced in both machine direction and cross-machine direction by the shrinkable endless base fabric. Thus the fabric reinforced belts are adapted to withstand the tremendous pressures of up to 6,000 psi in nip press operation.

While a detailed description of the inventive method has been provided it is to be understood that the scope of the invention is not to be limited thereby but is to be determined by the scope of the claims which follow.

What is claimed is:

1. A method of making a belt for use in papermaking comprising the steps of:
   providing a mandrel having a smoothly polished surface;
   applying a first coat of liquid urethane to the mandrel.
   drying the first coat of liquid urethane;
   placeing a fabric sleeve onto the coated mandrel;
   applying a second coat of liquid urethane to the fabric encapsulated urethane coated mandrel; and drying the second coat of urethane.

2. A method of making a belt for use in papermaking comprising the steps of:
   providing a smooth mandrel with a highly polished surface adapted to transmit a smooth inner surface to the belt;
   applying a first coat of a thermoset resin to the mandrel;
   drying the first coat of resin;
   grinding the first coat of resin to a predetermined uniform thickness;
   placing a shrinkable fabric sleeve onto the coated mandrel;
   shrinking the fabric sleeve onto the coated mandrel;
   applying a second coat of thermoset resin onto the fabric encapsulated coated mandrel;
   drying the second coat of resin; and
   removing the belt, comprising the layers of thermoset resin and fabric sleeve, from mandrel.

3. A method according to claim 2 wherein the step of shrinking the fabric sleeve comprises applying heat thereto.

4. A method according to claim 2 wherein the step of applying a second coat of thermoset resin further comprises applying the second coat with a squeegee, and wiping excess thermoset resin from the surface thereby resulting in knuckles forming on the outside surface of the belt.

5. A method according to claim 2 further comprising the step of applying a releasing agent to the smooth mandrel prior to applying the first coat of resin, and wherein the step of removing the belt from the mandrel comprises introducing compressed air between the polished surface of the mandrel and the first coat of resin.

6. A method according to claim 2 wherein the step of shrinking the fabric sleeve involves contacting the mandrel tightly with the sleeve after shrinking.

7. A method according to claim 2 wherein the steps of drying the first and second coats, and shrinking the fabric sleeve comprise applying infrared heating thereto.

8. A method according to claim 2 wherein the step of drying the second coat further comprises merging the first and second layers of thermoset resin into one continuous layer encapsulating the fabric sleeve.

9. A method of making a belt for use in papermaking comprising the steps of:

providing a smooth mandrel mounted on a shaft for rotation;

rotating the mandrel about the shaft applying a first coat of liquid urethane thereto;

drying the first coat of liquid urethane by providing a drying apparatus mirroring a portion of the mandrel circumference;

grinding the dried first coat of urethane to a predetermined thickness;

mounting a shrinkable woven fabic sleeve having threads in a machine direction and a cross machine direction to the mandrel;

shrinking the fabric sleeve to contact the mandrel by rotating the mandrel while in thermal communication with the drying apparatus;

applying a second coat of urethane resin to the fabric sleeve encapsulated first coat by rotating the mandrel, and using a wiping means to wipe away excess urethane so that the outer surface of the second coat extends to the radially outmost point of the fabric sleeve;

drying the second coat by rotating the mandrel in thermal communication with the drying apparatus; and removing the belt, comprising the fabric sleeve encapsulated within the urethane coatings from the mandrel.

* * * * *